J. H. STEELE.

SPICE BOX.

No. 3,692. Reissued Oct. 26, 1869.

Witnesses

J. H. Shimway

Michael Ryan

Joseph H. Steele

Assignee of

W. A. Miles

Inventor

By Attorney

John E. Earl

THE NORRIS PETERS CO., PHOTO-LITHO., WASHINGTON, D. C.

UNITED STATES PATENT OFFICE.

JOSEPH H. STEELE, OF NEW HAVEN, CONNECTICUT, ASSIGNEE OF WALLACE A. MILES.

IMPROVED SPICE-BOX.

Specification forming part of Letters Patent No. 58,455, dated October 2, 1866; Reissue No 3,692, dated October 26, 1869.

*To all whom it may concern:*

Be it known that WALLACE A. MILES, of Meriden, in the county of New Haven and State of Connecticut, invented a new and Improved Spice-Box; and I do hereby declare the following, when taken in connection with the accompanying drawings and the letters of reference marked thereon, to be a full, clear, and exact description of the same, and which said drawings constitute part of this specification, and represent, in—

Figure 1:
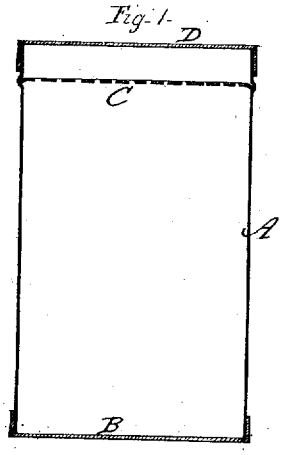
Figure 2:
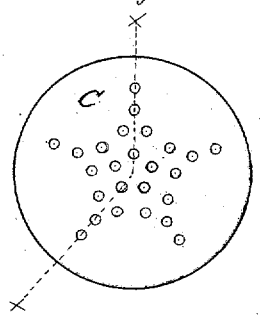

Figure 1, a vertical central section; Fig. 2, a plan of the perforated plate, and in Fig. 3 a vertical central section of the plate C arranged close to the cover.

This invention relates to an improvement in sheet-metal spice-boxes, the object being to construct such boxes of the usual cylindrical form, so that they may be used as a dredge for sprinkling the contents of the box; and the invention consists in fixing permanently on one end of the box a perforated plate provided with a perforated cover or plate, which may be removed to open the said perforations, and the other end of the box with a removable cover, the last-named cover being used for filling the box.

A is a sheet-metal cylinder of the usual form and size for spice-boxes.

B is a cover fitted to set on over one end and form practically the bottom of the box, but so as to be removed when desirable.

C is a perforated plate, in Fig. 1 represented as set into an annular groove a little distance from the edge of the box, the said groove being formed in the usual manner for making beads on sheet metal, the perforated plate being "sprung in" and so as to be held firmly in its position. Over the end of the box in which the perforated plate is arranged is placed a cover, D, in the usual manner, so as to be easily removed when required. Thus the box is provided with a removable cover at both ends, and the box is filled by taking off the cover B, and when filled replace the cover. Then when desired for use as a dredge the other cover, D, is removed and the contents sprinkled through the perforated plate C; or if a quantity is required, then remove the other cover, B, leaving the cover D to close the perforations.

Figure 3:
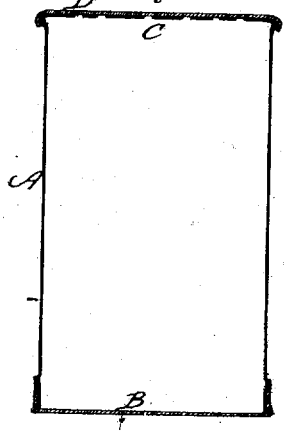

In Fig. 3 the perforated plate C is arranged as closed on over the edge of the box, and the cover D set thereover, as before, the difference between the two being simply this, that the plate C is arranged in close contact with the cover D, instead of a slight distance therefrom, as in Fig. 1.

I claim as the invention of the said WALLACE A. MILES—

A sheet-metal spice-box provided with covers B and D, and combined with the perforated plate C, so as to operate as specified.

JOSEPH H. STEELE.

Witnesses:
J. H. SHUMWAY,
MICHAEL RYAN